United States Patent [19]

deVries

[11] 4,225,566
[45] Sep. 30, 1980

[54] PROCESS FOR PERFORMING MULTIPLE CHEMICAL REACTIONS

[75] Inventor: Egbert deVries, Kettering, Ohio

[73] Assignee: Quad Corporation, Highland Park, Ill.

[21] Appl. No.: 904,647

[22] Filed: May 10, 1978

[51] Int. Cl.³ .............................................. B01D 53/34
[52] U.S. Cl. .................................. 423/210; 423/224; 423/240; 423/245; 423/659
[58] Field of Search .............. 423/210, 224, 240, 245, 423/659; 55/68, 73

[56] References Cited

U.S. PATENT DOCUMENTS

| | | | |
|---|---|---|---|
| 2,532,554 | 12/1950 | Joeck | 239/4 |
| 2,848,302 | 8/1958 | Jappelt et al. | 423/550 X |
| 3,421,699 | 1/1969 | Babington et al. | 239/337 |
| 3,966,889 | 6/1976 | Kakuta et al. | 423/210 |
| 3,969,479 | 7/1976 | Lonnes et al. | 423/224 |
| 4,125,589 | 11/1978 | deVries | 423/245 |

FOREIGN PATENT DOCUMENTS 1288023  9/1972  United Kingdom .................... 423/240

Primary Examiner—Earl C. Thomas
Attorney, Agent, or Firm—Fidelman, Wolffe & Waldron

[57] ABSTRACT

Two or more liquid reagents are caused to react simultaneously within the same reaction vessel with different components of a gas stream. The gas stream being treated is introduced into the top of a reaction vessel and is withdrawn from the bottom. A first chemical reagent is introduced into the top of the vessel in the form of a finely divided spray. The second liquid reagent is introduced in like fashion at a lower level. The two sprays are allowed to travel unimpeded to the bottom of the tower while reacting with different components of the gas stream.

13 Claims, 1 Drawing Figure

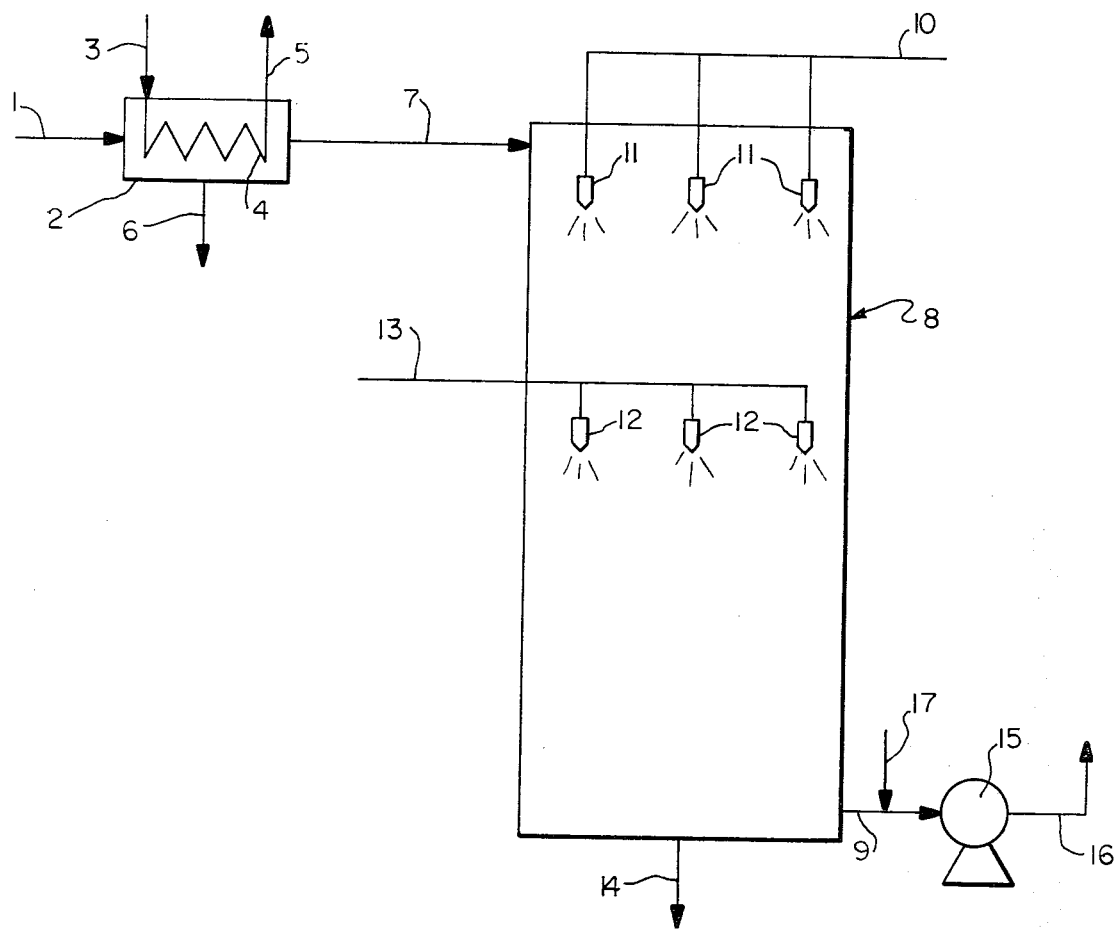

PROCESS FOR PERFORMING MULTIPLE CHEMICAL REACTIONS

BACKGROUND OF THE INVENTION

This invention relates to the reaction of liquid reagents with components contained in a gas stream. More specifically, this invention relates to the cleaning of gas streams by the reaction of unwanted constituents thereof with liquid reagents. It finds particular use in the removal of odorous constituents from waste gas streams.

A wide variety of processing plants and industrial processes are faced with the problem of removing odorous constituents from waste gas streams. Examples include rendering plants, dog food producers, sewage sluge digestion plants, flavors and fragrances production, and fermentation processes. In many instances, removal of the polluting gaseous constituents is complicated by the presence in the gas stream of pollutants derived from differing sources. Differences in chemical reactivity and solubility of the pollutants toward treating reagents makes it difficult or impossible to remove a variety of pollutants by use of a single reagent. In these circumstances it is conventional to treat the gas in multiple stages using a different reagent in each stage.

It is known in the prior art to remove odors from waste gases produced in sewage sluge digestion processes by contacting the gas with an aqueous solution of an oxidizing agent such as sodium hypochlorite. British Patent No. 1,152,705 describes such a process in which waste gases from a bacterial digester are contacted with large quantities of an aqueous oxidizing agent in an open or unpacked tower.

One common commercial process for removing odors from rendering plant exhaust gases utilizes scrubbing of the gases with an aqueous solution of sodium hypochlorite. A typical commercial installation of this sort utilizes a two stage cross-flow scrubber system for the treatment of low intensity odors. Overall efficiency of the two stages is reported to be on the order of 80 to 90%. A cross-flow scrubber system is not sufficient to remove high intensity odors, however, and for these odors there is typically used a venturi and packed bed scrubber system operating in series. The cross-flow scrubber system utilizes a high spray density of relatively large (200 micron) water droplets. Spray solutions are recirculated and are discharged. This type of system does have the advantage of treating high gas flows at low pressure drops. Venturi and packed bed scrubbers are characterized by requiring a high power input and large pressure drop.

Another approach to the removal of odors from waste gases is disclosed in commonly owned U.S. Patent Application Ser. No. 649,696, now U.S. Pat. No. 4,125,589. The process disclosed in this application utilizes contacting of a waste gas stream with a very finely divided spray of an aqueous hypochlorite solution. This process allows reduction of odor intensity from 50,000 or more odor units to less than 100 odor units in a single stage.

SUMMARY OF THE INVENTION

A pollutant-containing gas is simultaneously reacted with two or more liquid reagents in the same reaction zone. The gas is introduced into an upper portion of a reaction zone and withdrawn from the bottom thereof. A first chemical reagent is sprayed into the upper portion of the reaction zone in the form of finely divided droplets having a median particle size of less than 10 microns. A different chemical reagent is introduced in the same fashion at a level below that of the first reagent but substantially above the bottom of the reaction zone. Liquid droplets of the different reagents are allowed to settle unimpeded to the bottom of the reaction zone and are then removed.

Hence, it is an object of this invention to conduct two or more chemical reactions simultaneously within the same reaction zone.

It is another object of this invention to simultaneously remove two or more chemically dissimilar pollutants from a gas stream.

Yet another object of this invention to remove multiple odorous contaminants from a gas stream in a single reaction stage.

A specific object of this invention is to treat waste gases containing contaminants of differing chemical reactivity in a single treatment zone.

BRIEF DESCRIPTION OF THE DRAWING

The FIGURE represents a schematic flowsheet of one preferred embodiment of the invention.

DETAILED DESCRIPTION OF THE INVENTION

This invention finds use in the removal of odorous, noxious, or otherwise undesirable contaminants from waste gas streams such as those produced in the treatment or conversion of animal, vegetable or other organic materials. It also finds use in the treatment of exhaust gas streams from a variety of industrial processes such as wire coating, paint making, chemical conversion and the like. The invention will be better understood by reference to the drawing which sets out a schematic flowsheet of one preferred embodiment of the process.

Referring now to the FIGURE, there is shown in schematic form one preferred embodiment of this invention. A pollutant containing gas stream 1 is passed through a condenser 2 wherein the gas stream is subjected to indirect heat transfer with an incoming cooling water stream 3 which passes through heat exchange element 4 and exits the condenser by was of line 5. Condensible components within the gas stream are removed via drain line 6 and are disposed of in any suitable manner.

This condensing step is preferred in the treatment of all waste gas streams containing a significant quantity of water vapor or other condensible gases and having a temperature significantly above ambient. It is neither necessary nor desirable in those instances where the gas stream being treated as cool or cold and contains few condensible gases. Depending upon the composition of the gas stream, the condensing step can offer significant advantages. The condensation step along will significantly reduce the concentration of certain contaminating materials and will reduce the volume of the gases in the subsequent treatment stage.

Uncondensed gases are passed via conduit 7 from the condenser to treatment zone 8. This treatment zone preferably comprises a tower or reaction vessel empty of any structural components which would interfere with the free and unhindered contact of liquid droplets with gaseous contaminants. In one preferred embodiment, treatment vessel 8 comprises a tank or similar vessel constructed of fiber glass or like materials. Size of the vessel is of course dependent upon the volume of gas being treated and the reaction time required but in all instances it must be of sufficient heighth to insure a contacting time of liquid droplets with the gas of more than 5 seconds and preferably of more than 10 seconds. In a practical sense, this requires a treatment vessel height of at least about 7 feet and more typically on the order of 10 to 20 feet. Diameter of the tank in typical commercial installations may range from about 8 to 20 feet although both smaller and larger diameters can be effectively used.

It is preferred to introduce gas stream 7 near the top of vessel 8 tangentially to the side of the vessel. Such tangential injection insures an intimate distribution of treating liquid droplets with the incoming gas stream. After passing downwardly through the treating tower, the gas stream is removed via conduit 9 located at a lower side of the tower.

A first liquid chemical reactant is introduced into reaction tower 8 at an upper level thereof. This liquid reactant is supplied via conduit 10 from a source (not shown) and is passed to spray nozzles 11. It is required that nozzles 11 produce a very finely divided liquid spray having a median droplet size smaller than 10 microns and preferably on the order of 2 to 8 microns. A number of different commercially available nozzles are capable of achieving this result. For example, ultrasonic spray nozzles such as those disclosed in U.S. Pat. No. 2,532,554 to Joeck are suitable for use in this process. Such nozzles require a source of compressed gas, such as air, for operation. In some instances use of steam rather than compressed air to power the nozzles is advantageous. Steam is usually available on a plant site and, with proper plumbing of the reagent lines, will prevent freezing of the reagent lines and the nozzles. Other devices commonly referred to as nebulizers such as those disclosed in the Babington U.S. Pat. No. 3,421,699 are also suitable for this purpose.

Nozzles 11 may be mounted in any suitable pattern through the roof of vessel 8 as is shown in the drawing. In other instances, it may be preferred to mount the nozzles in a ring configuration through the side wall of vessel 8 at an upper part thereof. In this embodiment, the nozzle plumes are preferably oriented tangentially into the vessel in the same gas flow direction as was induced by the tangential introduction of gas stream 7.

Disposed somewhat below nozzles 11, but substantially above the floor of vessel 8 are a second group of nozzles 12. Spacing between the two groups of nozzles is not critical but must be sufficient to avoid interference between the respective nozzle plumes and to allow sufficient time for the first reaction to have progressed. A second liquid chemical reagent is fed to these nozzles by way of conduit 13. It is also required that nozzles 12 produce a very finely divided liquid droplet spray having a median droplet diameter of less than 10 microns. Nozzles 12 may be identical to nozzles 11 and in most instances this is preferred. Nozzles 12 may be arranged within the tower in any appropriate pattern provided that appropriate care is taken to create as little obstruction as possible to the unimpeded movement of droplets within the tower. However, it is usually preferred that nozzles 12 be mounted in a ring configuration through the side walls of tower 8. This arrangement allows ready servicing and cleaning of the nozzles and avoids obstruction within the tower itself. When mounted through the side walls of tower 8, nozzles 12 are preferably oriented so that the nozzle plume is directed tangentially to the tower wall in the same direction as the gas flow. Additionally, it is usually preferred to direct the nozzle plume slightly upwardly.

The droplets of the two treating reagents can collide and react to some extent as they travel downwardly with the gas stream. However, because of the vast number of droplets present in the reaction zone, interaction between the reagents does not significantly affect the efficiency of the process. As the liquid droplets reach the tower floor they coalesce and are removed from tower 8 by way of liquid drain line 14. Liquid from line 14 may be further treated or disposed of in any appropriate fashion.

The treated gas stream is removed from the bottom of tower 8 by way of conduit 9 under the influence of a suction produced by fan or blower 15. Gas from blower 15 is passed through conduit 16 to a stack or other suitable vent. Because the treated gas is essentially at its dew point, it is often desirable to dilute the treated gas stream with a second gas stream of lower dew point so as to avoid a vapor plume. This may be done by inducing a stream of air or other suitable gas into conduit 9 by way of conduit 17.

A wide variety of liquid reagents including chemically incompatible liquid reagents can be utilized in this process. For example, if the gas being treated contains contaminants which react with an acidic reagent and also contains other contaminants which react with a basic reagent, the gas stream can be simultaneously treated with both an acid and a base without substantial reaction between the two reagents until they coalesce on the floor of the tower. It of course would be impossible to accomplish treatment if the two reagents were mixed prior to introduction into the tower. It is also possible to simultaneously treat a gas stream with an oxidizing reagent and a reducing reagent. Other combinations of liquid treating reagents can be used in the same fashion.

One specific illustration of chemically incompatible reagents appropriate for use in this process is that of aqueous hypochlorite and acid. As is well known, an aqueous hypochlorite solution will readily react with an acid to produce gaseous chlorine and a salt. Some odorous compounds such as those derived from the cookers in rendering plants react readily with hypochlorite solutions by oxidation to form innocuous and essentially odorless reaction products. Other rendering plant waste gases contain odorous compounds which are not eliminated by oxidation with hypochlorite but which do react with acids such as sulphuric or hydrochloric. This invention allows collection of waste gases from diverse sources within a rendering plant or like facility and their subsequent removal in a single reaction stage.

Another example of an industrial process wherein this invention finds use is in the treatment of a flavor spray drier exhaust. These exhaust gases contain odorous constituents reactive with acids and bases or with oxidants and reductants and may be treated in a single reaction zone with either pair of reagents.

Examples of oxidizing reagents useful in this process include aqueous solutions of hypochlorite, of chlorine dioxide, hydrogen peroxide, ozone and permanganate. Of these oxidizing reagents, hypochlorite solutions have been found to offer the greatest versatility and usefulness. Hypochlorite solutions are economical, may be generated on site, and are highly reactive toward many common odorous contaminants. Depending upon the composition of the gas stream being treated, these oxidants may be used in combination with reducing reagents, with acids, or with other reagents displaying chemical reactivity toward an oxidant. Other combinations of treating reagents will be obvious to those or ordinary skill in the art. For example, sodium bisulfite readily reacts with aldehydes. Thus, a waste gas containing aldehydes could be treated simultaneously with bisulfite and with another compound which reacts with bisulfite.

Reagent concentration is not critical but in most cases a dilute aqueous solution is preferred. When using an oxidizing reagent such as hypochlorite, concentrations of about 100 to 1000 ppm are appropriate. Acid concentrations found most useful generally range from about 0.5 to 5%. Reagent flowrate must be sufficient to provide at least a stoichiometric reaction with the contaminant constituents. Additionally, reagent flowrate must be sufficient to avoid excessive evaporation of reagent when treating gas having a low moisture content. Flowrates will generally range from about 0.01 to 1 gallon per 1000 cubic feet of gas.

In addition to odor removal, hypochlorite treatment of a gas stream acts to disinfect or to sterilize a gas stream. This additional benefit is of particular importance in the treatment of exhaust gas from sewage plant digesters or from fermentation reactors.

The effectiveness of this process in comparison to prior art techniques is believed to be the result of a combination of factors. First, the small droplet size provides a vastly greater reactive surface area with the same volume of liquid reagent. Second, there is an increased contact time within the reaction vessel because of the very slow droplet settling rate. Third, and probably most importantly, there is a vastly increased chance of collision between gaseous molecules and the chemical reagent droplets.

The droplets are essentially of collodal size and display what might be considered to be Brownian movement. Rather than falling rapidly downward in an essentially straight path as do larger droplets, the tiny droplets used in this process exhibit an erratic zigzag pattern caused by the collision between gaseous molecules and the droplets. This flow path is lengthened by tangentially directing the flow of gas through the reaction zone and by directing the nozzles tangentially upward. This combination of factors also produces another beneficial result unobtainable in prior art techniques. Because of the essentially complete reaction that can be routinely achieved between the chemical reagent and the gas contaminants it is unnecessary to use a large excess of treating reagent. Hence, volume of treating reagent used is decreased substantially and recycle of partially reacted treating reagent is neither necessary nor desirable.

The following table sets out a comparison of the reaction parameters of this process as contrasted to a state of the art technique. The comparison is based on the treatment of three thousand cubic feet per minute of a gas containing about 50,000 odor units.

TABLE

| Parameter | This Invention | Prior Art |
| --- | --- | --- |
| Volume of vessel (ft$^3$) | 1000 | 30 |
| Dimensions of vessel (ft.) | 3' diameter 20' height | 3'×3'×3' |
| Gas residence time (seconds) | 20 | 0.06 |
| Reagent flow rate (gpm) | 0.167 | 30 |
| Reagent droplet size (microns) | 2 | 400 |
| Number of reagent droplets within vessel at any one time | $5.1 \times 10^{14}$ | $3.4 \times 10^6$ |
| Relative probability of collision between a gas molecule and reagent droplet | $10^8$ | 1 |
| Terminal settling velocity of reagent droplet in air (ft/sec) | $4.5 \times 10^{-3}$ | 50 |
| Odor units in gas entering vessel | 50,000 | 50,000 |
| Odor units in treated gas exiting vessel | 100 | 5,000 |

As can be seen by this table, this process provides a substantial improvement over that obtainable by prior art techniques.

The following example illustrates one specific use of the invention.

EXAMPLE

Waste gases from two different sources in a rendering plant were merged and were treated in the manner shown in the drawing. One of the waste gases was derived from the cookers and contained a high concentration of non-condensible odors which were known to readily react with a basic solution of sodium hypochlorite. The second waste gas stream was derived from the crackling press and these odorous compounds cannot be eliminated by hypochlorite treatment. The crackling press odors are characterized as "burnt" odors and are typified by such compounds as dimethyl pyrazine. These odors are not eliminated by oxidation with hypochlorite but can be rendered odorless by acidification. Concentration of odors from both sources were sufficiently high as to be extremely offensive.

The gas streams were introduced into a treating tower having two sets of nozzles as was previously described. A dilute aqueous hydrochloric acid stream having a concentration of approximately 2-3% was introduced into the tower through the uppermost nozzles. A dilute sodium hypochlorite solution having a concentration ranging between 200 and 1000 ppm was introduced into the reaction zone through the lower set of nozzles. Gas residence time within the treating tower was approximately 15-20 seconds.

The treated gas stream was removed from the bottom of the tower was essentially odorless and suitable for discharge into the atmosphere. There was no discernible gaseous chlorine produced.

What is claimed:

1. A method for simultaneously reacting multiple components of a gas stream with two or more liquid reagents which comprises:
    passing said gas stream into an upper level of a reaction zone;
    introducing into the upper level of said reaction zone a finely divided spray of a first liquid reagent, the droplet size of said spray having a median diameter of less than about 10 microns;
    introducing a finely divided spray of a second liquid reagent into the same reaction zone at a level below that of said first liquid reagent but substantially above the bottom of said zone, the droplet size of said second reagent spray having a median diameter of less than about 10 microns;
    allowing the droplets of said first and second liquid reagents to travel unimpeded to the bottom of said zone;

maintaining the gas flow through said reaction zone at a rate which allows a contact time between the spray droplets of said liquid reagents and the gas stream of at least about 5 seconds;

removing settled out spray droplets containing the reaction products of both said first and second reagents with components of the gas stream from the bottom of the reaction zone, and separately removing the gas stream from a lower level of the reaction zone.

2. The process of claim 1 wherein one of said liquid reagents is an acid and wherein another of said liquid reagents reacts with said acid upon admixture.

3. The process of claim 2 wherein said acid-reactive liquid reagent is a base.

4. The process of claim 2 wherein said acid-reactive liquid reagent is an aqueous hypochlorite solution.

5. The process of claim 4 wherein said acid is selected from the group consisting of hydrochloric and sulfuric acids.

6. The process of claim 5 wherein said acid has a concentration between 0.5 and 5%.

7. The process of claim 4 wherein said aqueous hypochlorite solution has a concentration of about 10 to 50,000 ppm.

8. The process of claim 7 wherein said aqueous hypochlorite solution has a concentration of 100 to 1000 ppm.

9. The process of claim 1 wherein one of said liquid reagents is an oxidant and wherein another of said liquid reagents is a reductant.

10. The process of claim 1 wherein the flow rate of each of said liquid reagents is in the range of 0.01 to 1 gallon per 1000 cubic feet of gas treated.

11. The process of claim 4 wherein said gas stream is a rendering plant exhaust gas containing odorous constituents reactive with hypochlorite and other odorous constituents reactive with acid.

12. The process of claim 4 wherein said gas stream is a flavor spray drier exhaust.

13. The process of claim 9 wherein said gas stream is a flavor spray drier exhaust.

* * * * *